US006073705A

United States Patent [19]

Shibata et al.

[11] Patent Number: 6,073,705

[45] Date of Patent: Jun. 13, 2000

[54] POWER-DRIVEN STRIKING TOOL HAVING A MECHANISM FOR SETTING THE CIRCUMFERENTIAL ANGLE OF TOOL BITS ATTACHED TO THE STRIKING TOOL

[75] Inventors: Mitsuyoshi Shibata, Nishio; Masaaki Uchida, Chiryu, both of Japan

[73] Assignee: Makita Corporation, Anjo, Japan

[21] Appl. No.: 09/166,709

[22] Filed: Oct. 5, 1998

[30] Foreign Application Priority Data

Oct. 6, 1997 [JP] Japan .................................... 9-272967

[51] Int. Cl.[7] ...................................................... B23B 31/07

[52] U.S. Cl. ............................ 173/200; 173/48; 279/19.5

[58] Field of Search ................................ 173/200, 48, 47, 173/205, 109; 279/19.3, 19.4, 19.5

[56] References Cited

U.S. PATENT DOCUMENTS

| | | | |
|---|---|---|---|
| 3,430,708 | 3/1969 | Miller | 173/205 |
| 3,847,229 | 11/1974 | Wanner et al. | 173/48 |
| 3,876,014 | 4/1975 | Moores, Jr. | 173/47 |
| 4,236,588 | 12/1980 | Moldan et al. | 173/48 |
| 4,434,859 | 3/1984 | Rumpp et al. | 173/48 |
| 4,491,445 | 1/1985 | Hunger et al. | 279/19.3 |
| 4,585,077 | 4/1986 | Bergler | 173/48 |
| 4,824,298 | 4/1989 | Lippacher et al. | 173/48 |
| 5,603,516 | 2/1997 | Neumaier | 279/19.5 |
| 5,833,405 | 11/1998 | Nielsen | 279/19.3 |

FOREIGN PATENT DOCUMENTS 9-174317 8/1997 Japan .

*Primary Examiner*—Peter Vo
*Assistant Examiner*—Jim Calve
*Attorney, Agent, or Firm*—Lahive & Cockfield, LLP

[57] ABSTRACT

There is provided a power-driven striking tool including: a casing; a tool holder rotatably supported inside the casing and having a front end to which a tool bit is attached; and an operating member fitted around the tool holder and exposed to the outside of the tool so as to be manually slidable in the axial directions of the tool holder and integrally rotatable with the tool holder. The operating member is biased rearward by a compression spring along the axis of the tool holder into contact with the casing. The tool further includes first teeth provided on the operating member where it comes into contact with the casing and second teeth provided on the casing where it comes into contact with the operating member. When the operating member is brought into contact with the casing, the first and second teeth engages each other to prevent the operating member and thus the tool holder from rotating relative to the casing.

9 Claims, 4 Drawing Sheets

POWER-DRIVEN STRIKING TOOL HAVING A MECHANISM FOR SETTING THE CIRCUMFERENTIAL ANGLE OF TOOL BITS ATTACHED TO THE STRIKING TOOL

BACKGROUND OF THE INVENTION

1. Field of the Invention

The present invention relates to power-driven striking tools. More particularly, the present invention relates to a mechanism for use in a power-driven striking tool for setting the circumferential angle of tool bits attached to the striking tool.

2. Description of the Related Art

In a power-driven striking tool, a tool bit is inserted into the tool holder and locked therein so as to prevent the tool bit from slipping out of the tool holder. Certain types of tool bits, such as chisels, must be attached to striking tools at a certain circumferential angle suitable for specific operation. The Applicant disclosed an invention to achieve the objective in Japan Published Unexamined Patent Application No. 9-174317. That invention provides a power-driven tool which comprises: a tool holder disposed in a housing so as to be rotatable and slidable in the axial directions of the tool between forward and rear positions; means for biasing the tool holder in the rear direction (the direction opposite to the end of the tool holder into which a tool bit is inserted); an anti-rotation member, provided at the rear end of the tool holder, for engaging and locking the tool holder in the rear position when the tool holder is pushed rearward by the biasing means. The striking tool further comprises an operating member secured to the tool holder so that the operating member and the tool holder can be rotated and slid together. To change the circumferential angle of a tool bit inserted in the tool holder, the operating member is slid forward to disengage the tool holder from the anti-rotation member and rotated to a desired angle. Thereupon, the operating member is slid rearward to engage the tool holder with the anti-rotation member at the angle.

While adequate for the purpose intended, this structure has certain inherent disadvantages or deficiencies. More specifically, when the power-driven tool is at idle or when the operator removes the tool bit from the workpiece, such as earth, the impact on the tool holder from the advancing striking member may push the tool holder forward and disengage it from the anti-rotation member, thereby unintentionally changing the set angle of the tool bit. Such unintended disengagement can occur when the tool bit is jammed in a workpiece, such as earth or concrete. That is, when the operator attempts to dislodge the jammed tool bit from such a workpiece, the striking tool is pulled back, often leaving the bit and the tool holder still stuck in the workpiece. As this means the tool holder is moved forward relative to the main body of the striking tool, it is disengaged from the anti-rotation member, possibly resulting in an inadvertent change in the angle of the tool bit as in the previously described case.

Furthermore, changing the circumferential angle of the tool bit requires the operator to move the operating member, the tool bit, and the tool holder together in the axial direction. High operability cannot be achieved from this arrangement, since as many as three parts need to be moved.

SUMMARY OF THE INVENTION

In view of the above-identified problems, an important object of the present invention is to provide a power-driven striking tool in which the circumferential angle of the attached tool bit is not unintentionally and inadvertently changed.

Another object of the present invention is to provide a power-driven striking tool in which the circumferential angle of the attached tool bit can be changed with a high degree of operability.

The above objects and other related objects are realized by the invention, which provides a power-driven striking tool including: a casing; a tool holder rotatably supported inside the casing and having a front end where a tool bit is attached; and an operating member fitted around the tool holder and exposed to the outside of the tool so as to be manually slidable in the axial directions of the tool holder and integrally rotatable with the tool holder. In this tool, the operating member is biased by a biasing means along the axis of the tool holder into contact with the casing. The striking tool further includes a first engaging means provided on the operating member where it comes into contact with the casing and a second engaging means provided on the casing where it comes into contact with the operating member. When the operating member is brought into contact with the casing, the first and second engaging means engage each other to prevent the operating member, and thus the tool holder, from rotating relative to the casing.

According to one aspect of the present invention, the first engaging means includes a plurality of teeth that are formed on the operating member and that extend axially toward the casing and the second engaging means includes a plurality of teeth that are formed on the casing and that extend axially toward the operating member.

According to another aspect of the present invention, the biasing means is a compression spring disposed on the side of the operating means opposite the first engaging means so as to bias the operating member toward the case, thereby engaging the first engaging means with the second engaging means.

According to still another aspect of the present invention, the operating member is a sleeve member having an inner surface and an outer surface and the tool holder is a cylindrical member having an inner surface and an outer surface. Furthermore, at least one axial slide groove is formed in the outer surface of the tool holder and at least one complementary axial slide protrusion is formed on the inner surface of the operating member and fit in the at least one slide groove such that the operating member is allowed to rotate together with the tool holder and to slide relative to the tool holder.

According to yet another aspect of the present invention, under normal operating conditions the operating member is biased by the biasing means in the direction opposite the front end of the tool holder.

The present invention is also directed to a power-driven striking tool including: a casing; a tool holder rotatably supported inside the casing and having a front end where a tool bit is attached; an anti-rotation means disposed on the tool holder so as to be manually rotated integrally with the tool holder and slid along the axis of the tool holder between a first position and a second position. In the first position, the anti-rotation means is engaged with the casing and the tool holder so as to prevent the rotation of the tool holder. In the second position, the anti-rotation means is disengaged from the casing while remaining engaged with the tool holder, so that the anti-rotation means and the tool holder can be manually operated from the outside of the tool to change the circumferential angle of the tool bit held in the tool holder.

In accordance with another aspect of the present invention, the above power-driven striking tool is further provided with a biasing means for biasing the anti-rotation means into engagement with the tool holder under normal operating conditions. Moreover, the anti-rotation means can be manually disengaged and slid away from the case against the force of the biasing means, thus allowing the anti-rotation means and the tool holder to be manually rotated to change the circumferential angle of the tool bit held in the tool holder.

In one practice, the anti-rotation means is a sleeve which is fitted around, and is in slidable engagement with, the tool holder and includes a plurality of teeth for engaging the casing.

To carry out the invention in one preferred mode, the biasing means is a compression spring that, under normal operating conditions, biases the anti-rotation means into engagement with the tool holder in the direction opposite the front end of the tool holder.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENT

A preferred embodiment according to the present invention is described hereinafter with reference to the attached drawings.

Figure 1:
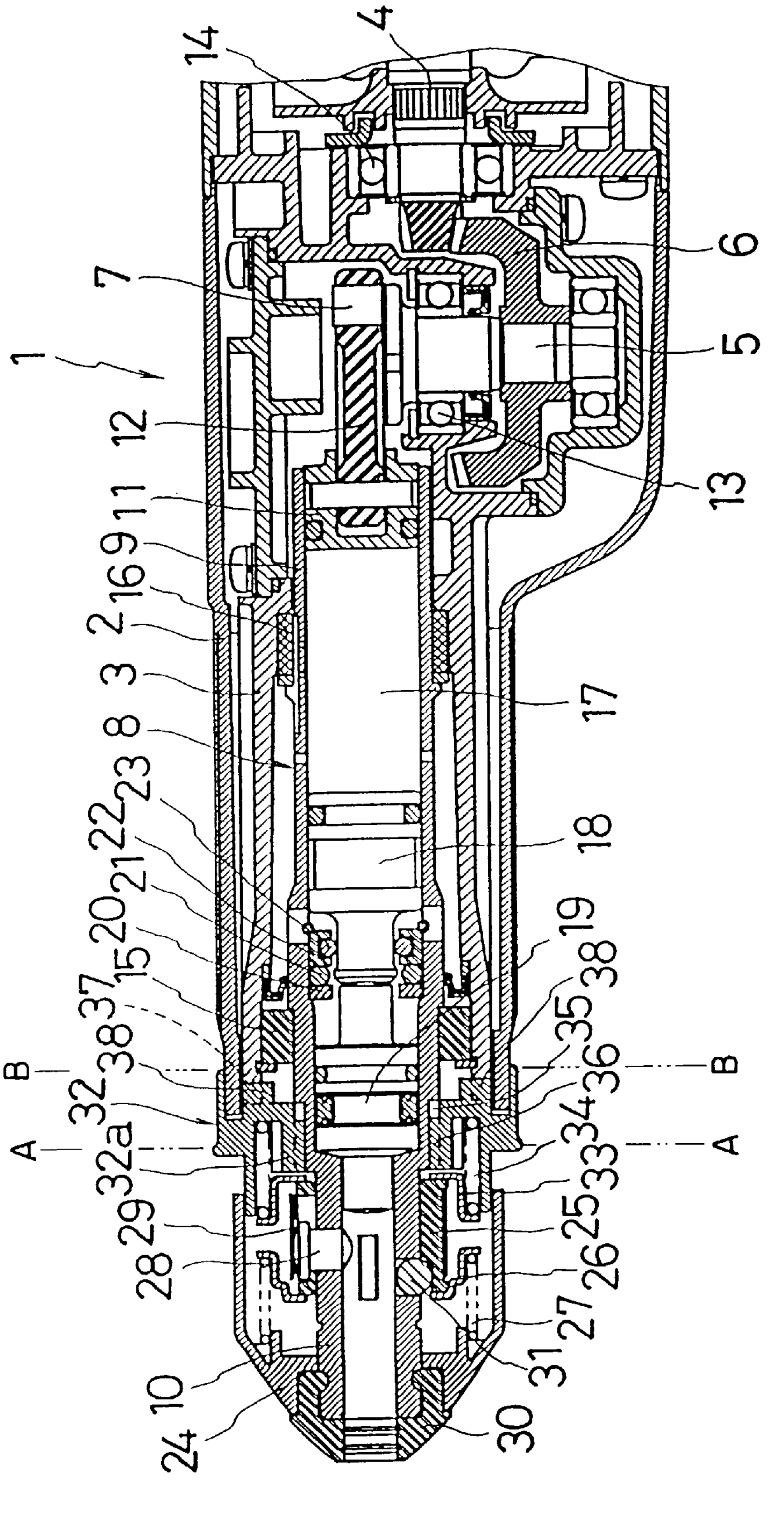
FIG. 1 is a cross section of an essential part of a power-driven hammer according to the present invention with no tool bit attached thereto.

FIG. 1 is a cross section of an essential part of a power-driven hammer according to the present invention. Reference numeral 1 indicates a power-driven striking tool. A motor (not shown) is disposed in the rear of the hammer 1, or to the right of the drawing. The shaft 4 of the motor is in mesh with a spiral bevel gear 6 which is integrally formed with a crank shaft 5 which is in turn supported by a ball bearing 13 at a right angle to the axis of the hammer. Provided on the crank shaft 5 is an eccentric pin 7 which is connected to a piston 11 by means of a rod 12. The piston 11 is inserted in a cylinder portion 9 of the rear of a tool holder 8. This crank mechanism transmits and converts the rotation of the motor shaft 4 into the reciprocating motion of the piston 11.

In order to reduce the vibration in the power-driven hammer 1, the crank mechanism is encased in an integrally molded, main housing 3 that extends toward the rear of the hammer 1 and supports the tool holder 8 and ball bearings 13 and 14 which support the crank shaft 5 and the motor shaft 4, respectively.

The cylinder portion 9 of the tool holder 8 is supported in the main housing 3 by rings 15 and 16. A striking member 18 is reciprocably disposed within the cylinder portion 9 in front of the piston 11 across an air chamber 17. When the hammer 1 is in operation, the reciprocating motion of the piston 11 creates an air spring effect in the air chamber 17, thereby causing the striking member 18 to also reciprocate in the cylinder portion 9. While reciprocating in the cylinder portion 9, the striking member 18 collides against an intermediate member 19 also reciprocably disposed in front thereof. The impact of the collision causes the intermediate member 19 to impact the rear end of a tool bit fitted in the tool holder 8.

Reference numeral 20 indicates a flat washer, 21 an o-ring, 22 an o-ring case, and 23 another o-ring. These elements are disposed between the intermediate member 19 and the striking member 18 in order to regulate the impact and position of the intermediate member 19 in normal operation and to grip the reduced diameter front end of the striking member 18 when it advances at the beginning of idling, thus disconnecting the pneumatic interlock between the striking member 18 and the intermediate member 19.

The diameter of the front portion of the tool holder 8 is reduced to form a chuck 10 around which is fitted a chuck cover 24 that can be slid back and forth along its axis. Likewise, a chuck ring 25 having a spring guide 26 at the front end thereof is reciprocably fitted around the chuck 10 under the chuck cover 24. A compression spring 27 is disposed between the spring guide 26 and the chuck cover 24 to bias these two elements in opposite directions. Also provided beneath the chuck cover 24 is a stopper pin 28 that movably penetrates the chuck ring 25 and the chuck 10. In addition, the stopper pin 28 is biased toward the axis of the chuck 10 by a leaf spring 29 fitted around the chuck ring 25 so as to engage the head of the stopper pin 28 with the chuck ring 25. As a result, as shown in FIG. 1, the axial movement of the chuck ring 25 is regulated so that the chuck cover 24 is at the front position abutting on a cap 30 under normal conditions. Reference numeral 31 indicates a steel ball provided in a through-hole in the chuck 10. When the chuck ring 25 is slid forward and over it, the steel ball 31 is pushed radially toward the axis of the chuck 10.

Figure 3:
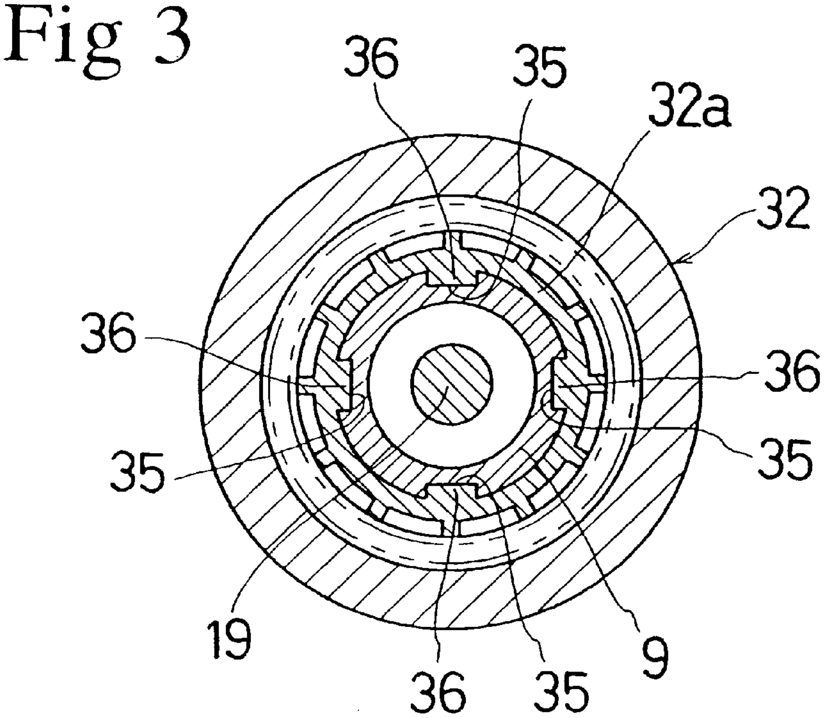
FIG. 3 is an enlarged cross section of the power-driven hammer taken along line A—A of FIG. 1.

A change ring or operating member 32 is fitted around the front end of cylinder portion 9 and positioned between the chuck cover 24 and an outer casing 2 of the hammer 1. The front end of the change ring 32 is inserted inside the chuck cover 24 while the larger rear end is fitted over the outer surface of the outer casing 2 and exposed so as to be manually operated from the outside of the hammer 1. In addition, the change ring 32 is biased rearward by a second compression spring 34 interposed between the ring 32 and another spring guide 33 provided on the rear end of the chuck ring 25. The change ring 32 is also provided with a small-diameter inner cylinder 32a mounted on the cylinder portion 9. Referring to FIG. 3, which is an enlarged cross section of the hammer 1 taken along line A—A of FIG. 1, four axial slide protrusions 36 are formed on the inner surface of the change rings 32 at regular intervals, whereas four complementary axial slide grooves 35 are formed in the outer surface of the cylinder portion 9. In assembly, the protrusions 36 are fitted in the grooves 35. This structure allows the change ring 32 to rotate integrally only with the rotation of the tool holder 8, while still permitting the change ring 32 to slide relative to the tool holder 8. Under normal conditions, the change ring 32 is pressed into contact with the front end of the main housing 3.

Figure 4:
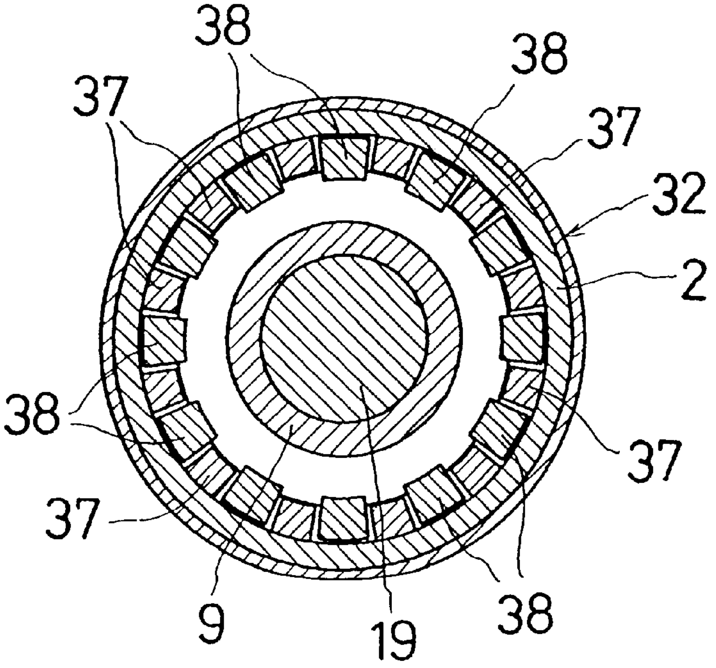
FIG. 4 is an enlarged cross section of the power-driven hammer taken along line B—B of FIG. 1.

Referring to FIG. 4, which is an enlarged cross section of the hammer 1 taken along line B—B of FIG. 1, rear teeth 37 are formed on the front end of the main housing 3, whereas complementary front teeth 38 are formed on the rear end of the change ring 32. When these two sets of teeth 37 and 38 are in mesh with each other, rotation of the change ring 32 is prevented.

Figure 2:
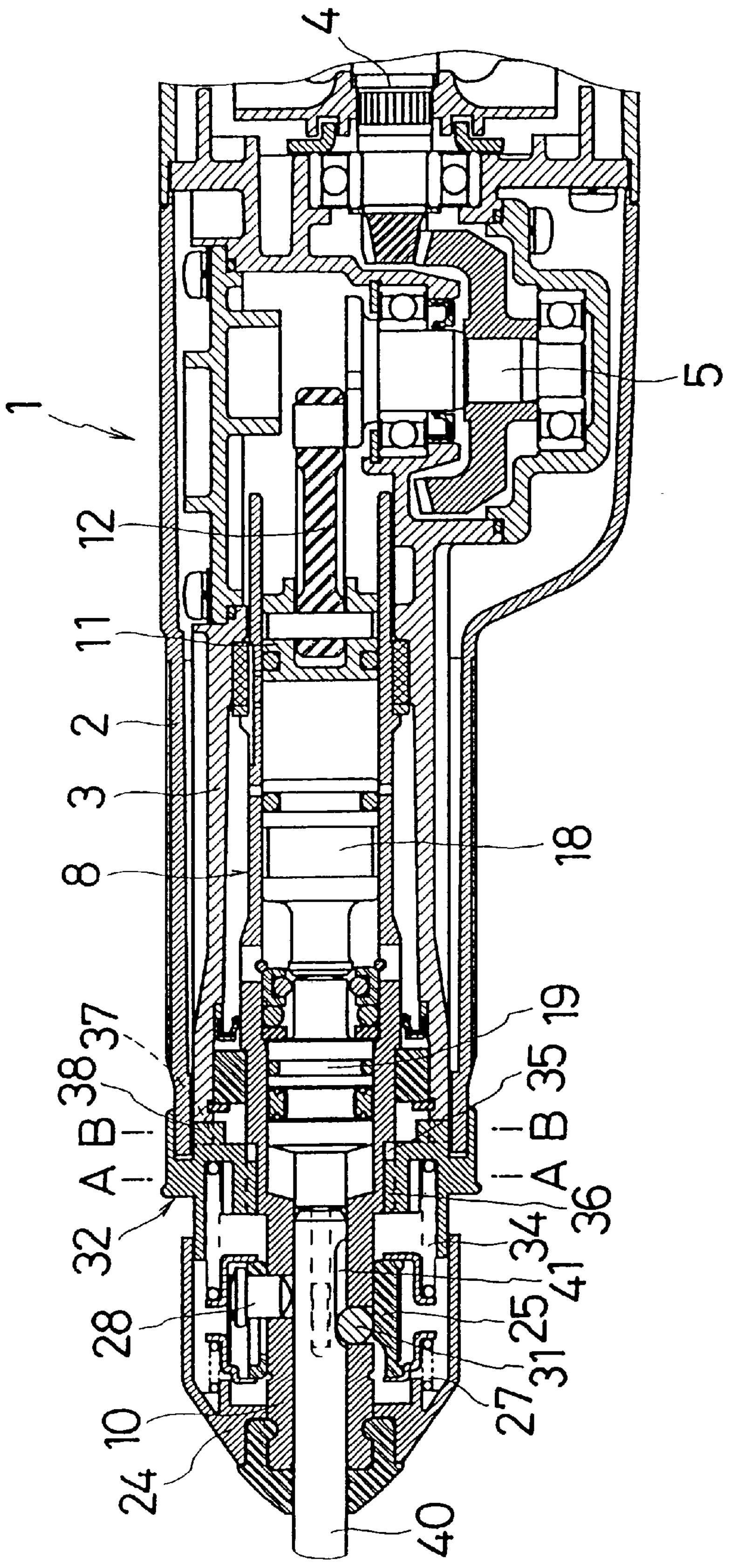
FIG. 2 is a partial cross section of the power-driven hammer of FIG. 1 with a tool bit attached thereto.

To attach a tool bit 40 to the power-driven hammer 1 (for the hammer with no tool bit attached, see FIG. 1), the rear portion of the tool bit 40 is inserted into the chuck 10 of the tool holder 8. When the rear portion of the tool bit 40 comes into contact with the top end of the stopper pin 28 and pushes the pin, the head of the pin is disengaged from the chuck ring 25. This allows the chuck ring 25 to move forward by the biasing force of the compression spring 34 (as the biasing force of the compression spring 34 is greater than that of the front compression ring 27), thus forcing the steel ball 31 toward the axis of the chuck 10. As shown in FIG. 2, the steel ball 31, now protruding from the inner surface of the chuck 10, engages a lock groove 41 of the tool bit 40 to complete the attachment of the bit 40 to the hammer 1.

Figure 5:
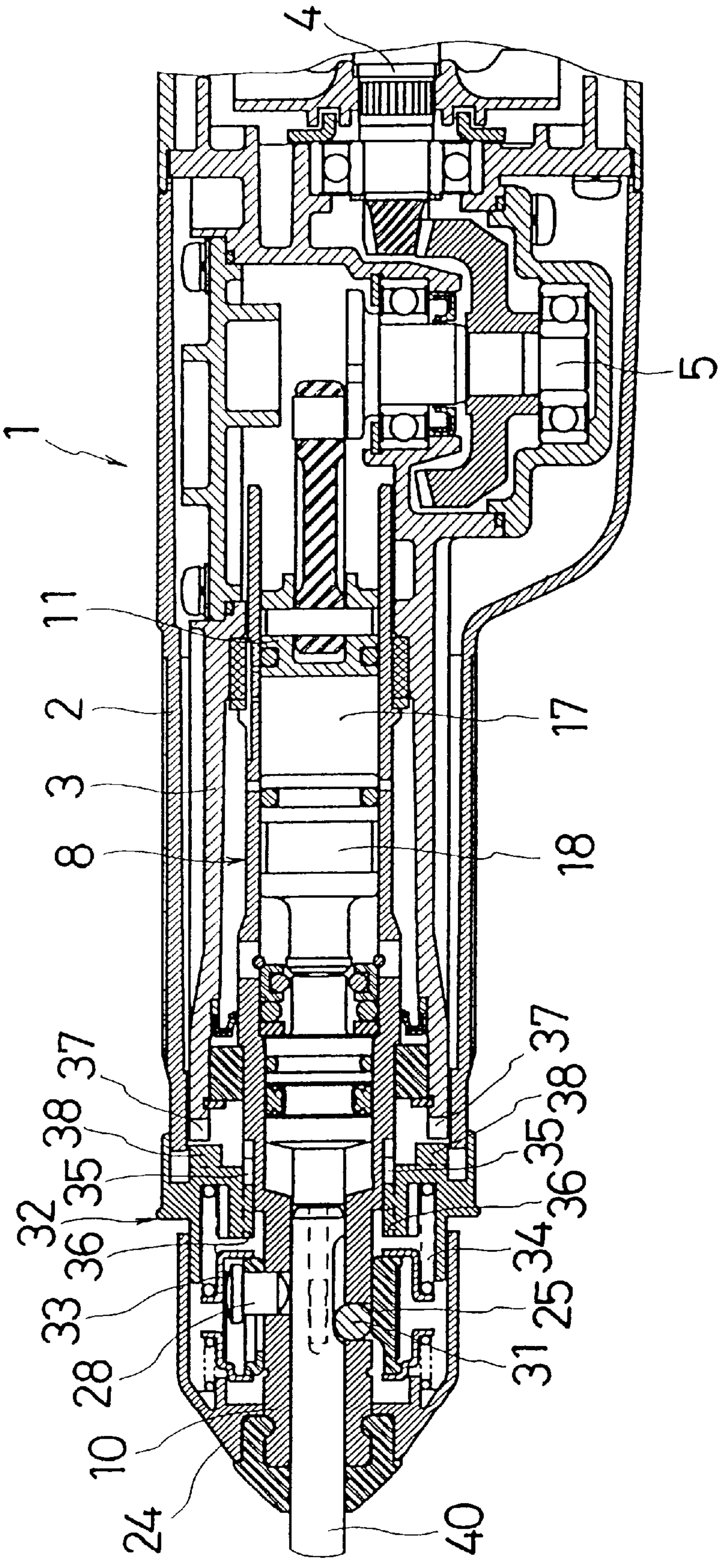
FIG. 5 shows a partial cross section of the power-driven hammer of FIG. 1 with its change ring slid forward.

To change the circumferential angle of the tool bit 40, the change ring 32 is slid forward to disengage the front teeth 38 on the change ring 32 from the rear teeth 37 on the main housing 3 as shown in FIG. 5. Whereup, the tool holder 8 is rotated to a desired angle by turning the change ring 32. It should be noted that as the change ring 32 can be slid only as far as the spring guide 33 and that the slide protrusions 36 remain fitted in the slide grooves 35 regardless of the axial position of the change ring 32. After the desired angle is set by the operator, the change ring 32 is slid backward to engage the front teeth 38 on the change ring with the rear teeth 37 on the main housing 3, thus prohibiting the change ring 32 and the tool holder 8 from rotation relative to the main housing 3.

As described above, the hammer 1 is structured so that the engagement of the tool holder 8 with the change ring 32 prevents rotation of the tool holder 8. In addition, this structure allows the circumferential angle of the tool bit 40 to be changed by simply sliding the change ring 32 and rotating it. Since only the change ring 32 needs to be operated for this purpose, the operability of the hammer 1 is enhanced beyond that of conventional hammers in which a plurality of elements need be operated to change the angle of tool bits.

Moreover, axial movement of the tool holder 8 is not required to change the angle of the tool bit 40. As a result, the axial position of the tool holder does not inadvertently change, thereby preventing the rear teeth 37 and the front teeth 38 from disengaging when the power-driven tool is at idle, when the operator detaches the tool bit from a workpiece, or when the tool bit is jammed in a workpiece. Accordingly, no accidental change in the angle of the tool bit 40 occurs.

Note that the manner of connection of the change ring 32 to the tool holder 8 is not limited to the foregoing example. Insofar as the integral rotation of the two elements and the slide of the change ring 32 on the tool holder 8 are ensured, any other suitable arrangement may be adopted, such as the spline connection or the key connection. Likewise, the numbers and/or the shapes of the front and rear teeth 37 and 38 may be modified to suit specific applications.

In the above preferred embodiment, the change ring 32 is biased rearward into engagement with the main housing 3 and slid forward to disengage the change ring from the housing. It is possible to reverse the position of engagement by providing teeth on front end the change ring 32 and biasing it forward into engagement with teeth provided on the main housing in front of the change ring. In this configuration, the change ring 32 is slid backward to disengage the change ring 32 from the main housing 3.

As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

What is claimed is:

1. A power-driven hammer comprising an outer casing extending along a tool axis and defining an outside of the hammer, a main housing mounted inside said outer casing and extending along the tool axis, said main housing having an interior, a tool holder extending along the tool axis and rotatably supported in the interior of the main housing, said tool holder having a front end for receiving a tool, an operating member fitted around the tool holder and exposed to the outside of the hammer, the operating member being slidable along the tool axis and integrally rotatable with the tool holder, biasing means coupled to said operating member for biasing said operating member along the tool axis and into contact with the main housing a first engaging means provided on the operating member where the operating member comes into contact with the main housing, and a second engaging means provided on the main housing where the main housing comes into contact with the operating member, the second engaging means disposed to engage the first engaging means to prevent the operating member from rotating relative to the main housing when the operating member is brought into contact with the main housing.

2. A power-driven hammer in accordance with claim 1, wherein the first engaging means comprises a plurality of teeth formed on the operating member and extending along the axis toward the main housing and the second engaging means comprises a plurality of teeth formed on the main housing and extending along the axis toward the operating member.

3. A power-driven hammer in accordance with claim 2, wherein the biasing means is a compression spring disposed on the side of the operating means opposite the first engaging means so as to bias the operating member toward the case, thereby engaging the first engaging means with the second engaging means.

4. A power-driven hammer in accordance with claim 3, wherein the operating member is a sleeve member having an inner surface and an outer surface and the tool holder is a cylindrical member having an inner surface and an outer surface and wherein at least one axial slide groove is formed in the outer surface of the tool holder and at least one complementary axial slide protrusion is formed on the inner surface of the operating member and fit in the at least one slide groove such that the operating member rotates together with the tool holder and slides relative to the tool holder.

5. A power-driven hammer in accordance with claim 1 wherein the operating member is biased by the biasing means in the direction opposite the front end of the tool holder.

6. A power-driven hammer, comprising an outer casing extending along a tool axis and defining an outside of the hammer, a main housing mounted inside said outer casing and extending along the tool axis, a tool holder extending along the tool axis and rotatably supported inside the main housing, said tool holder having a front end for attachment to a tool bit at a selected circumferential angle, and an anti-rotation means disposed on the tool holder so as to rotate integrally with the tool holder and to slide along the tool axis between a first position, in which the anti-rotation means engages the main housing and the tool holder so as to prevent the rotation of the tool holder, and a second position, in which the anti-rotation means disengages from the main housing while remaining engaged with the tool holder, so that the anti-rotation means and the tool holder can be operated from the outside of the hammer to change the circumferential angle of the tool bit held in the tool holder.

7. A power-driven hammer in accordance with claim 6 further comprising a biasing means for biasing the anti-rotation means into engagement with the tool holder and wherein the anti-rotation means can be manually disengaged and slid away from the case against the force of the biasing means, thus allowing the anti-rotation means and the tool holder to be rotated to change the circumferential angle of the tool bit held in the tool holder.

8. A power-driven striking tool in accordance with claim 7, wherein the anti-rotation means is a sleeve which is fitted around, and is in slidable engagement with, the tool holder and includes a plurality of teeth for engaging the casing.

9. A power-driven hammer in accordance with claim 7, wherein the biasing means is a compression spring that biases the anti-rotation means into engagement with the tool holder in the direction opposite the front end of the tool holder.

* * * * *